March 8, 1966    G. F. TAYLOR    3,238,950
APPARATUS FOR SHELLING PEAS, BEANS AND THE LIKE
Filed June 7, 1963    3 Sheets-Sheet 1
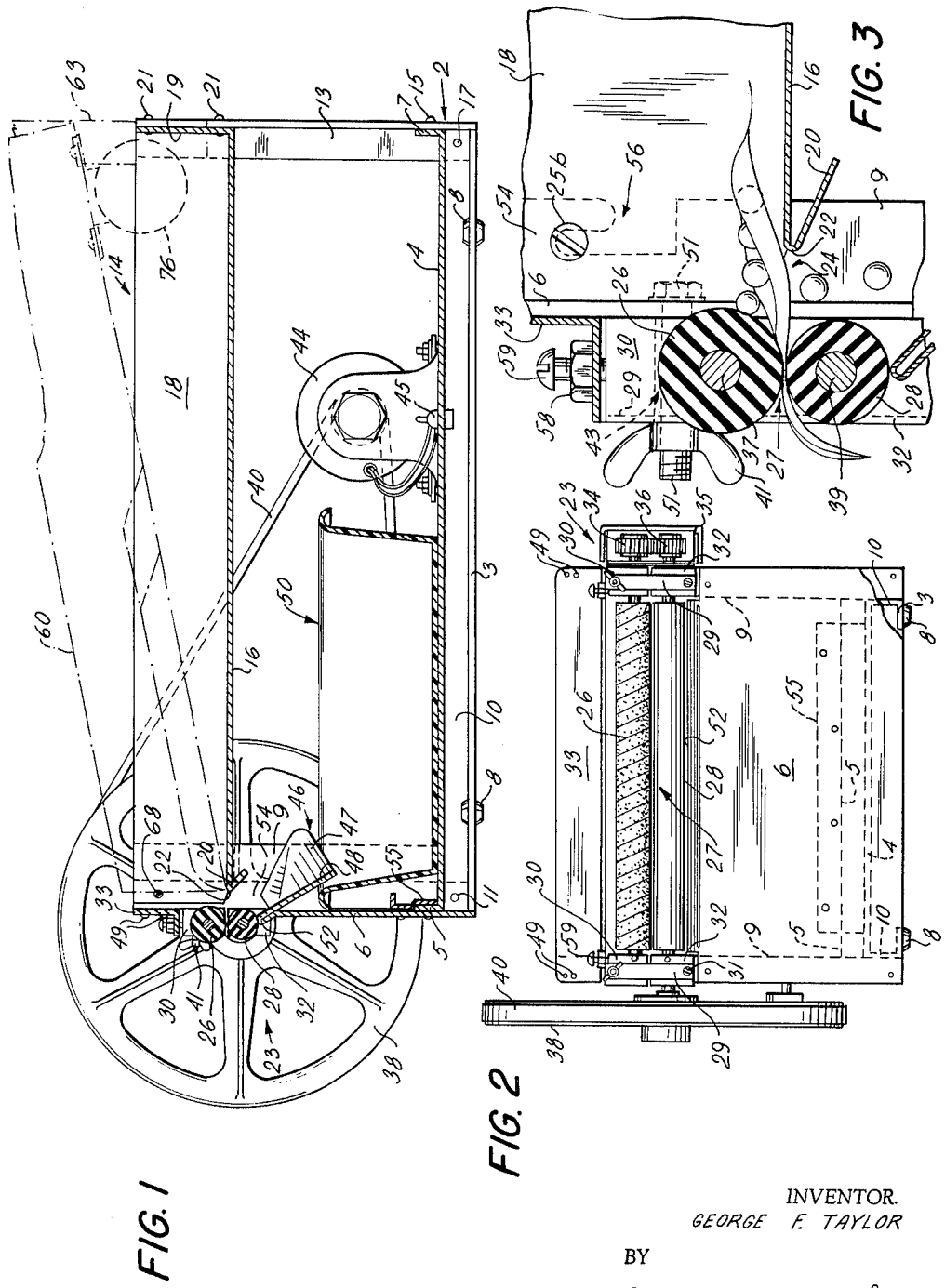
INVENTOR.
GEORGE F. TAYLOR
BY
Curtis, Morris and Safford
ATTORNEYS March 8, 1966  G. F. TAYLOR  3,238,950
APPARATUS FOR SHELLING PEAS, BEANS AND THE LIKE
Filed June 7, 1963  3 Sheets-Sheet 2
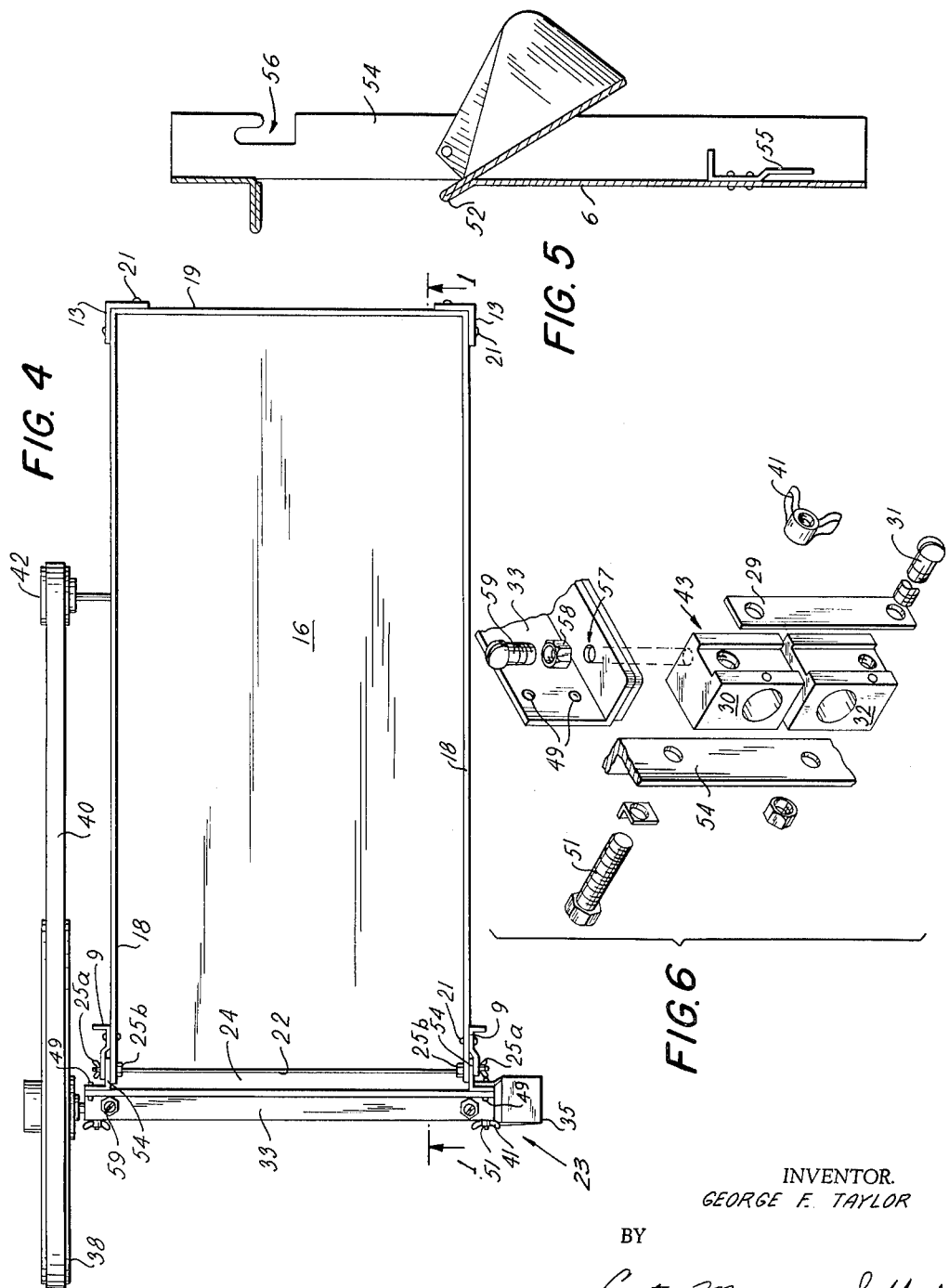
INVENTOR.
GEORGE F. TAYLOR
BY
Curtis, Morris and Safford
ATTORNEYS March 8, 1966  G. F. TAYLOR  3,238,950
APPARATUS FOR SHELLING PEAS, BEANS AND THE LIKE
Filed June 7, 1963  3 Sheets-Sheet 3
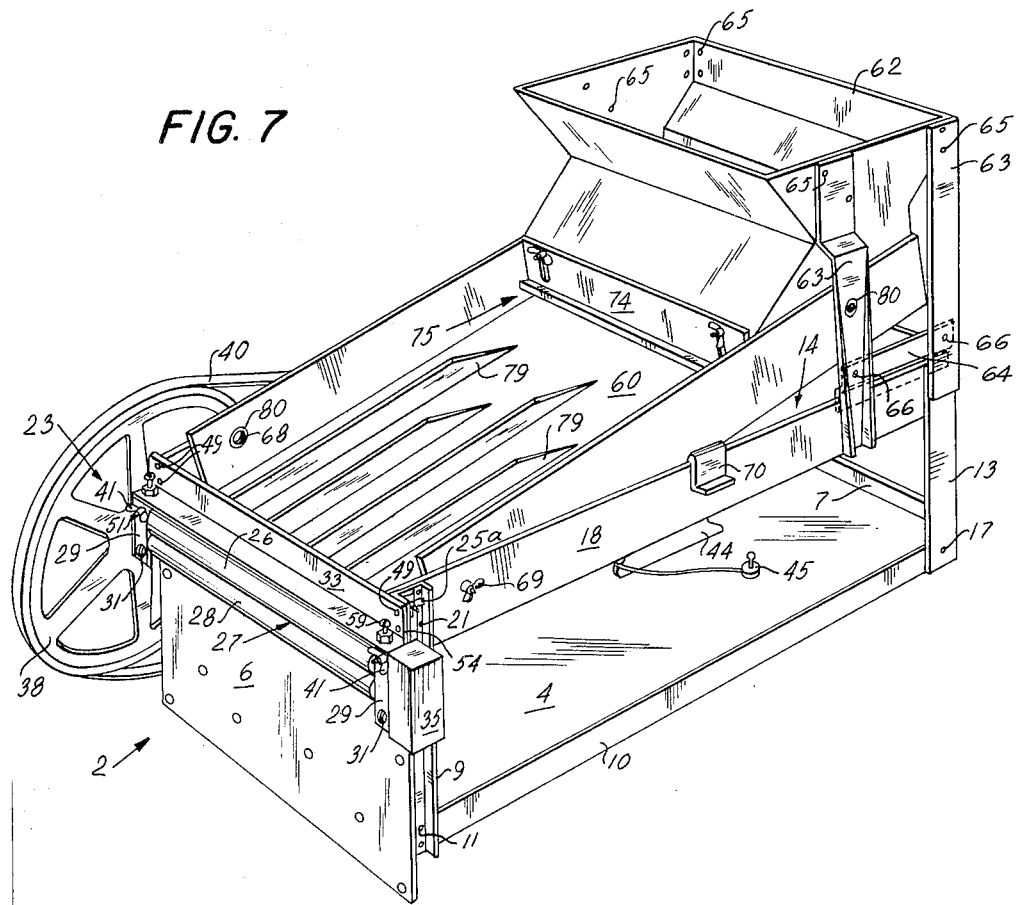
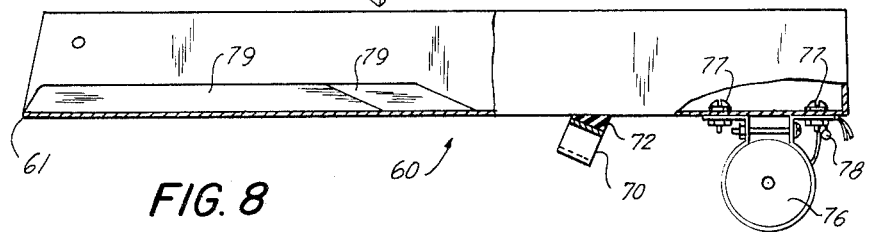
INVENTOR.
GEORGE F. TAYLOR
BY
Curtis, Morris and Safford
ATTORNEYS United States Patent Office 3,238,950
Patented Mar. 8, 1966

3,238,950
APPARATUS FOR SHELLING PEAS, BEANS
AND THE LIKE
George F. Taylor, Moultrie, Ga.
Filed June 7, 1963, Ser. No. 286,304
5 Claims. (Cl. 130—30)

This is a continuation-in-part of my co-pending application Serial No. 75,425, filed December 12, 1960, now abandoned.

This invention relates to shelling peas, beans and the like, and more in particular to an improved sheller for various podded vegetables, such as peas, beans, lima beans, etc.

An object of this invention is to provide an efficient and dependable sheller of the type which can be used for shelling green peas, lima beans, mature string beans, black-eyed peas, etc. A further object is to provide such a sheller which adjusts easily to function properly with the differing pod widths of the different varieties. A still further object is to provide a simple and lightweight mechanism for shelling green peas, beans, and the like, which is readily disassembled for ease of hygenic cleaning (as required in hospitals and similar institutions) and for ease of servicing and transportation. A still further object is to provide apparatus of the above character which is inexpensive to manufacture, dependable in use and adaptable for shelling many different types of podded vegetables. Another object is to provide an automatic feed device for such an apparatus. These and other objects will be in part obvious, and in part pointed out below.

In the drawings:

FIGURE 1 is a vertical section of one embodiment of the invention sketching the feed device in dash-dot outline as it would appear mounted on the sheller;

FIGURE 2 is an end elevation of the embodiment of FIGURE 1;

FIGURE 3 is an enlarged view showing the action of the sheller rolls and the associated parts;

FIGURE 4 is a plan view of the embodiment of FIGURE 1;

FIGURE 5 is an enlarged vertical section of the removable front, with the shelling mechanism not shown in this view for purposes of simplicity;

FIGURE 6 is an exploded perspective of one set of roll bearings illustrating the adjustable mounting of an upper bearing;

FIGURE 7 is a perspective of the embodiment of FIGURE 1, showing in addition a vibrator feed unit; and, FIGURE 8 is a side elevation of the vibrator motor and its pan.

Referring to FIGURES 1 and 2 of the drawings, a sheller 2 has a rectangular heavy sheet metal base or bottom wall 4 which is turned downwardly along its side edges 3 (FIGURE 2), and thence inwardly to form a pair of supporting channels 10 having rubber feet 8. Bottom wall 4 is turned upwardly along its end edges to form vertical support flanges 5 and 7, respectively (FIGURE 1). Forward vertical corner posts 9 are riveted by rivets 11 (see FIGURE 7) to the supporting channels 10. Rear vertical corner bars 13 are riveted to rear support flange 7 by rivets 15 and to supporting channel 10 by rivets 17. Riveted to and supported on the four vertical corner posts 9 and 13 by rivets 21 is a top tray 14 which has a bottom wall 16, integral side walls 18, and an end wall 19. The left-hand edge (FIGURE 1) of bottom wall 16 is bent downwardly, and thence back to form an edge 22 and a guide and reinforcing baffle 20. Front wall 6, carrying shelling mechanism 23 thereon, is easily demountable by losening wing-nuts 25a on their bolts 25b (see FIGURE 4) to release the front-wall-angle-braces 54 so that the whole front wall assembly can be lifted up and out. The front wall 6 is held in place at its lower end by clip 55 (see FIGURE 5) which hooks over the forward vertical support flange 5 (see FIGURE 1) and by vertical-hook-slots 56 (in angle-braces 54) which hook over respective bolts 25b (see FIGURE 3). Having front wall 6 so easily removable is a great advantage in servicing and particularly in cleaning the shelling mechanism 23 of any vegetable matter which might tend to cling and decay. This is especially helpful when the sheller 2 is used by institutions, such as hospitals, which may practice or be required by law to have higher standards of cleanliness than normal, and therefore requiring more cleanings.

Spaced to the left of edge 22 and forming a vertical gap 24 are the active parts of the shelling mechanism, a pair of rubber-covered rolls 26 and 28 having a nip 27 in alignment with the upper surface of bottom wall 16. Roll 28 is of lesser diameter than roll 26, and the rolls are mounted through integral shafts 37 and 39, respectively, in bearing blocks 30 and 32. Each of the lower bearing blocks 32 is clamped to the adjacent vertical angle bar 54 beneath the lower end of a metal strip 29 by a bolt 31. Each of the upper bearing blocks 30 is clamped between the adjacent strip 29 and the adjacent angle bar 54 by a bolt 51 which pass in through hole 43 in block 30 (FIGURES 3 and 6). The diameter of hole 43 is greater than that of bolt 51, allowing block 30 and roller 26 a limited amount of vertical adjustment. Bolts 51 are provided with wing nuts 41 which may be loosened to facilitate the adjustment, and tightened to secure blocks 30 and the roller 26 which they carry in the position to which it is adjusted. Hence, the vertical dimension of nip 27 between the rolls can be adjusted by loosening these wing nuts 41 and moving the bearing blocks 30, vertically. To help in the adjustment of this nip 27, screws 59 (see FIGURE 3, particularly) provide vertical stops for blocks 30. The screw 59 is adjusted in threaded hole 57 to restrict the height to which the corresponding block 30 may be raised and is then set down by lock-nut 58. Extending between and riveted to the tops of the vertical angle bars 54 by rivets 49 is a horizontal angle bar 33.

The roll shafts 37 and 39 project beyond the right-hand bearing blocks 30 (FIGURE 2), and have mounted thereon and keyed thereto a pair of identical meshing gears 34 and 36 which are enclosed in a sheet metal casing 35. The teeth of these gears 34 and 36 are deep enough to ensure that positive effective engagement therebetween is maintained even when the nip 27 is opened to its greatest extent (with the bearing blocks 30 flush up against the horizontal angle bar 33). The left-hand (FIGURE 2) end of the shaft 39 of roll 28 projects beyond its bearing block 32, and has mounted thereon and keyed thereto a pulley 38 which is driven through a V-belt 40 and a smaller diameter pulley 42 by an electric motor 44 (FIGURE 1). A manual switch 45 permits starting and stopping of motor 44. Integral with the upper edge of end wall 6 is a chute 46 which has side walls 47 and a slanting wall 48 which deflects the shelled peas, beans, etc., from gap 24 to the right (FIGURE 1) into a removable plastic tray 50 resting on the bottom wall 4. Chute 46 is joined to the upper edge of wall 6 by an edge portion 52 which is spaced a small distance from roll 28, and acts as a wiper edge to remove substantially all the vegetable matter which might adhere to lower roll 28. A similar wiper could be installed for upper roll 26, if necessary.

As indicated above, the rolls are geared together so that they rotate at the same number of revolutions per second, but roll 26 is of the greater diameter, and therefore has a greater peripheral speed than roll 28. This differential surface speed combines with the action of the larger diameter upper roll 26 to produce a very efficient and dependable shelling action. This action is illustrated in FIGURE 3 (which gives an enlarged view of the shelling mechanism 23), where a pod of green peas is represented during its shelling operation. When the pod is being moved to the left along wall 16, it breaches the vertical gap 24, and its leading edge projects into nip 27. This forward end of the pod is guided by the overhanging downwardly-moving surface of roll 26, and the slower and upwardly-moving surface of roll 28. The pod is then pinched between the rolls, and the differential speed causes the pod to be canted or twisted. That is, each roll grips the pod from above and below respectively and since the surface of the upper roll 26 is moving faster than that of the lower roll 28, this gives a shearing action which acts on the pod tending to split the pod along its seamline. This promotes the breaking of the pod and the expulsion or popping out of the peas. Since the greater peripheral speed of the upper roll tends to spread the pods open, many of the peas are shelled before they even reach the rolls, and there is a tendency for the peas to be discharged downwardly. This means that the majority of the peas do not even touch the rolls and thereby are not bruised or mashed as so often happened with those shellers in the prior art which employed rolls. The present action is rapid and certain. The peas fall through gap 24, while the pods pass to the left and are discharged by the rolls. The wiping edge 52 insures against pods adhering to the bottom roll. Shelled peas which are thrown upwardly fall through gap 24 directly, or when being pushed by the feeding action of additional pods.

Rolls 26 and 28 are moulded rubber bonded and pinned or vulcanized directly or otherwise positively secured to their steel shafts. In this embodiment, they have knurled surfaces, although satisfactory operation has been obtained with relatively smooth surfaces. As shown on the upper roll 26 in FIGURE 2, the roll surfaces may be given a slight spiral configuration to assist in opening the pods by adding a lateral twisting shear to the longitudinal shear already exerted on the pods by the differential rolls. A spiral with a pitch of 1½ inches to 2 inches has been used advantageously. Although only one of the rolls is illustrated as spiralled in FIGURE 2 (for simplicity and to reduce manufacturing costs), there could just as effectively be opposing spirals on each of the rolls. In the illustrative embodiment, the upper roll 26 is 1 3/16 inches in diameter, and roll 28 is ⅞ inch in diameter. The gap of nip 27 is 1/100 inch at its minimum dimension. However, this may be adjusted for various pods up to ⅛ inch. With the gap of 1/100 inch, green peas are shelled in a very satisfactory manner.

The invention contemplates that the sheller rolls may be operated manually, although there are special advantages in the motor drive shown. The feeding of the pods to the shelling mechanism 23 may also be manual or automatic.

FIGURES 7 and 8 and the dash-dot outline in FIGURE 1 illustrate the automatic feed mechanism of the present illustrative embodiment. This feed mechanism comprises a sloping vibrator pan 60 with a supply hopper 62 mounted over its upper end. The latter is held in place by legs 63 and cross-clips 64 which mount on the side walls 18 at the rear of pan 14 (see FIGURE 7). Rivets 65 fix legs 63 to hopper 62, and rivets 66 fix clips 64 to legs 63. Pan 60, open at its lower end, is fixed in place with its lower edge 61 adjacent to edge 22 by pivot bolts 68 and wing nuts 69. The angle of feed of the vibrator pan 60 is controlled by slide 70, having a foam rubber pad 72, which clips over and adjustably slides along the tops of the lower pan sides 18. A quantity control baffle 74 adjusts the opening 75 from the supply hopper 62 to the lower portion of the vibrator pan 60 to control the rate of feed to the shelling mechanism 23. A vibrator motor 76, normally of the eccentric type, is mounted to the rear underside of pan 60 by bolts 77. This vibrator motor 76, by vibrating pan 60, overcomes friction to assist the feed by gravity to the shelling mechanism. An on-off switch 78 for the vibrator motor 76 is mounted at the rear of the pan 60 for easy access. Longitudinal feed guides 79 of alternately longer and shorter length ensure that the pod or other similar item to be shelled is presented longitudinally to the rolls 26 and 28 by turning these pods into the narrow passages formed between the guides 79. The guides 79 are of alternating length to prevent the pods from catching cross-wise, unable to turn into longitudinal alignment. The passages formed between the guides 79 should be at least somewhat wider than the widest variety of pods expected to be shelled but should also be narrower than the length of the shortest variety of pods to be shelled.

Rubber grommets 80 and rubber pad 72 help to quiet the operation of the vibrator motor 76.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In apparatus for shelling peas or beans or the like from their pods and for discharging the pod walls separately, the combination of, a pair of rolls having resilient surfaces and comprising a bottom roll and a top roll mount in parallel relationship one above the other and forming a nip having a thickness of the order of 1/100 to ⅛ inch and such that the pods are resiliently pressed between the roll surfaces when passing through the nip, driving means for positively driving both of said rolls whereby the peripheral speed of said top roll is greater than that of said bottom roll, chute means including pod guides to support and guide the pods longitudinally of themselves as they move toward said nip upon a plane substantially in alignment with said nip, said chute means being spaced from said nip whereby a longitudinal slot is formed therebetween, said slot having a width such that the pods passing toward said nip will bridge said slot and the pod walls will pass into and through said nip, said driving means driving said rolls whereby the difference in peripheral speed of said rolls is such as to cause the pods to be twisted and split open within said slot whereby the peas or beans or the like are removed from the pod walls and discharged within said zone, said top roll being of a larger diameter than said bottom roll whereby the peas or beans or the like discharged from the pods are deflected downwardly through said slot.

2. Apparatus as described in claim 1 which includes a pair of meshing gears which are of substantially the same diameter and are mounted respectively upon said rolls thereby to produce the difference in the peripheral speeds of the rolls.

3. Apparatus as described in claim 1 which includes chute means extending downwardly from said slot for the peas or beans or the like, and which also includes removable mounting means for said rolls.

4. Apparatus as described in claim 1 wherein said chute means comprises a feed pan inclined downwardly toward said nip, and wherein said pod guides comprise vertical guide members of alternating shorter and longer lengths which are spaced from each other less than the length of pods to be guided thereby, and a vibrator to vibrate said feed pan to assist the gravity feed of said pods along said pan.

5. Apparatus as described in claim 4 which further includes a supply hopper having an adjustable opening onto said feed pan whereby the delivery of said pods to said feed pan may be controlled.

(References on following page)

References Cited by the Examiner

UNITED STATES PATENTS

| | | | |
|---|---|---|---|
| 669,727 | 3/1901 | Fuller | 130—30 |
| 851,544 | 4/1907 | Mettler | 130—30 |
| 1,798,543 | 3/1931 | Kodama | 130—30 |
| 2,804,873 | 9/1957 | Williams et al. | 130—30 |
| 2,808,056 | 10/1957 | Scheel et al. | 130—30 |
| 2,820,459 | 1/1958 | Russell | 130—30 |

ABRAHAM G. STONE, *Primary Examiner.*

ANTONIO F. GUIDA, T. GRAHAM CRAVER,
*Examiners.*